US012776924B2

(12) United States Patent
Monter Prat

(10) Patent No.: US 12,776,924 B2
(45) Date of Patent: Oct. 27, 2026

(54) SECURE ELEMENT AND METHOD FOR MUTUALLY AUTHENTICATING A SECURE ELEMENT WITH A NETWORK ENTITY

(71) Applicant: Giesecke+Devrient Mobile Security Germany GmbH, Munich (DE)

(72) Inventor: Jordi Monter Prat, Dulles, VA (US)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 55 days.

(21) Appl. No.: 19/038,152

(22) Filed: Jan. 27, 2025

(65) Prior Publication Data

US 2026/0222231 A1 Jul. 30, 2026

(51) Int. Cl.
*H04L 9/32* (2006.01)
*H04L 9/30* (2006.01)

(52) U.S. Cl.
CPC .......... *H04L 9/3273* (2013.01); *H04L 9/3073* (2013.01)

(58) Field of Classification Search
CPC ............................ H04L 9/3273; H04L 9/3073
See application file for complete search history.

(56) References Cited

U.S. PATENT DOCUMENTS

| | | | | |
|---|---|---|---|---|
| 11,882,117 | B1 * | 1/2024 | Kumar | G06F 21/602 |
| 2019/0097794 | A1 * | 3/2019 | Nix | G06F 21/33 |
| 2024/0323034 | A1 * | 9/2024 | Kumar | H04L 9/3268 |

OTHER PUBLICATIONS

Bettale, Luk et al., "Post-Quantum Secure Channel Protocols for eSIMs: Design, Validation, and Performance Analysis", International Association for Cryptologic Research (IACR), Dec 12, 2024, pp. 1-31.
ETSI, "Cyber; Quantum-safe Hybrid Key Establishment", ETSI TS 103 744, ETSI, V1.1.12, Dec 9, 2024, pp. 1-70.
Globalplatform, "Secure Channel Protocol '11' Card Specification, v2.3—Amendment F", GlobalPlatform, Version 1.4, Mar. 31, 2024, pp. 1-80.
Extended European Search Report from Corresponding European Patent Application No. EP26153671.8, May 28, 2026.

* cited by examiner

*Primary Examiner* — Sm A Rahman
(74) *Attorney, Agent, or Firm* — Workman Nydegger

(57) ABSTRACT

Provided is a secure element for securely communicating over a communication network. The secure element comprises a storage unit, in which a set of computer-readable instructions for mutual authentication of the secure element with an external entity, a static key pair, and a receipt are stored. The secure element comprises a control unit which is configured to execute the set of computer-readable instructions which configure the control unit to: initiate a secure channel; generate at least one shared secret by executing an elliptic curve key agreement based on the static key pair; generate at least one session key for secure messaging over the secure channel based on the at least one shared secret and shared information, wherein the shared information includes the receipt; determine a new receipt based on one of the at least one session key; and store the new receipt in the storage unit.

19 Claims, 4 Drawing Sheets

SECURE ELEMENT AND METHOD FOR MUTUALLY AUTHENTICATING A SECURE ELEMENT WITH A NETWORK ENTITY

BACKGROUND

The present disclosure relates to a secure element, a terminal device comprising the secure element, and a corresponding method. The disclosure further relates to a non-transitory, computer-readable medium storing related instructions.

Massive amounts of devices connect daily to existing communication networks, in particular mobile communication networks. The number of connected devices, in particular terminal devices or end (user) devices, is increasing at an accelerating pace, e.g., due to the fourth industrial revolution which is driven by the Internet of Things (IoT).

For a secured communication over a communication network, a connected device needs to include a secure element. The secure element includes at least one security domain containing keys, profiles, PINs/PUKs, etc. and therefore provides the connected device with tools based on which secured communication channels to a network entity can be established. Establishing a secure communication channel requires authentication of the secure element, of the participating external entity of the communication network, or, ideally, of both. The latter case is also referred to as mutual authentication, i.e., the secure element authenticates to the network entity and the network entity authenticates to the secure element. Authentication is achieved through the process of initiating a secure channel and provides assurance to an entity that it is communicating with an authenticated entity.

GlobalPlatform Card Specifications Amendment F specifies a Secure Channel Protocol (SCP11) based on Elliptic Curve Cryptography (ECC) for mutual authentication. Elliptic Curve Key Agreement algorithm protocol is used for AES session keys establishment. SCP11 has three variants, based on the type of ECC keys used in the authentication.

In a first variant, SCP11a, two pairs of static keys and two pairs of ephemeral keys are used, e.g., as described in NIST 800-56A as "(Cofactor) Full Unified Model, C (2e, 2s, ECC CDH) Scheme" for curves with a cofactor of 1.

In a second variant, SCP11b, two ephemeral key pairs and one static key pair are used. The network entity, often also called off-card entity (OCE), does not have a static key pair. Instead, the ephemeral key pair of the OCE is used twice.

In a third variant, SCP11c, two static key pairs and one ephemeral key pair are used. The security domain of the secure element does not create an ephemeral key pair, the static key pair of the SD is used twice. This scheme is described in NIST 800-56A as "One-Pass Unified Model, C (1e, 2s, ECC CDH) Scheme".

According to the SCP11c variant, the security domain includes only one static key pair that is used twice during the ECC key agreement. The static key is used to diversify the session keys during the authentication process. This allows the possibility of pre-calculating session keys that can be used across multiple secure elements sharing the same static keys. The OCE can pre-calculate the session keys and thus the authentication performed by the security domain just with the knowledge of the public key of the static key stored in the secure element. Accordingly, offline scripts including the pre-calculated session keys may be generated, e.g., to push application updates onto the security element. Thus, the SCP11c variant may be used for authentication when managing large fleets of connected devices, e.g., containing 1000 or more connected device, without much overhead effort.

As a side effect, the SCP11c variant has some weaknesses compared with the other variants. SCP11c does not provide perfect forward secrecy as only one ephemeral key at OCE side is used during the authentication. Similarly, SCP11c does not provide an antireplay mechanism. Therefore, any generated script can be executed as many times as possible during the lifetime of the secure element, by anybody, without any restriction because neither counters nor ephemeral keys are used at security domain side that could prevent re-executions. These flaws make SCP11c a less secure variant, prone to potential attacks. Thus, GlobalPlatform put in place some restrictions to limit the impact of such flows: It forbids specific application protocol data units (APDUs) for the SCP11c variant (e.g. DELETE, PUT KEY, SET STATUS, . . . ). It requires complex mechanisms to limit the commands to be executed when ANY_AUTHENTICATED, such as authorization mechanism within Tag 'BF20' configured in OCE certificate.

Even within these usage restrictions imposed by the Global Platform, the possibility of unlimited re-execution of offline scripts by anybody as such exposes the secure element and the related connected device to further security related risk. For instance, a script that is used to install a new applet version may include a vulnerability that is found only after some time after its first usage. Accordingly, the script needs to be replaced by a new script containing the installation of a new applet version that fixes the vulnerability. In this case, even after installing a version of the applet with the fix for the vulnerability, it is still possible to execute the old script including the vulnerability.

While there are some proposals to improve such a situation such as updating the public key of the controlling authority for OCE certificates, named PK.CA-KLOC key, for verifying certificates, use a different OCE key, whitelist the serial number, and so on. But these solutions are still not secure enough because none of these solutions explicitly prevents the execution of any other script already generated and containing the pre-calculated session keys. Moreover, these solutions are not easy to implement or deploy since they require additional network functionality.

Hence, there is a need to provide a secure element and a corresponding method which is adapted for mutual authentication that includes an antireplay mechanism, while guaranteeing an offline scripting of the authentication of the secure element.

There may be a further need to provide a secure element and a corresponding method configured to execute the SCP11c variant for mutual authentication more securely.

SUMMARY

At least one of these objectives is solved with the features of the independent claims. Further, in particular advantageous embodiments are described in the dependent patent claims.

The core of the invention is based on the idea of chaining the session keys derived by the secure element. This chaining can be implemented into a secure element by using the previous receipt calculated at the end of the key derivation process as input to derive the new session keys. In this manner, the session keys will be valid only one time and the generated script with these session keys can only be executed once.

According to an aspect of the present invention, there is provided a secure element for securely communicating over a communication network, e.g., a mobile communication network. The secure element may be for use in a connected device or terminal. The secure element comprises a storage unit, in which a set of computer-readable instructions for mutual authentication of the secure element with an external entity, a static key pair, and a receipt are stored. The secure element comprises a control unit which is configured to execute the set of computer-readable instructions which configure the control unit to: initiate a secure channel; generate at least one shared secret by executing an elliptic curve key agreement based on the static key pair; generate at least one session key for secure messaging over the secure channel based on the at least one shared secret and shared information, wherein the shared information includes the receipt; determine a new receipt based on one of the at least one session key; and store the new receipt in the storage unit.

According to another aspect of the present invention, there is provided a secure element comprising a storage unit, in which a set of computer-readable instructions for mutual authentication of the secure element with an external entity, a static key pair, and a receipt are stored. The secure element comprises a control unit which is configured to execute the set of computer-readable instructions which configure the control unit to: initiate a secure channel; generate at least two shared secrets by executing an elliptic curve key agreement based on the static key pair, and preferably a static key pair of the external entity and an ephemeral key of the external entity; generate at least four session keys for secure messaging over the secure channel based on the at least two shared secrets and shared information, wherein the shared information includes the receipt; determine a new receipt based on one of the at least four session keys; and store the new receipt in the storage unit.

According to another aspect of the present invention, there is provided a terminal for securely communicating over a communication network. The terminal comprises a terminal control unit, a communication interface which is configured to communicate over the communication network, and a secure element that is operatively coupled to the control unit. The secure element comprises a storage unit, in which a set of computer-readable instructions for mutual authentication of the secure element with an external entity, a static key pair, and a receipt are stored. The secure element comprises a control unit which is configured to execute the set of computer-readable instructions which configure the control unit to: initiate a secure channel; generate at least one shared secret by executing an elliptic curve key agreement based on the static key pair; generate at least one session key for secure messaging over the secure channel based on the at least one shared secret and shared information, wherein the shared information includes the receipt; determine a new receipt based on one of the at least one session key; and store the new receipt in the storage unit.

According to another aspect of the present invention, there is provided a method of mutually authenticating a secure element with an external entity. The method comprises: initiating a secure channel; generating at least one shared secret by executing an elliptic curve key agreement based on the static key pair; generating at least one session key for secure messaging over the secure channel based on the at least one shared secret and shared information, wherein the shared information includes the receipt; determining a new receipt based on one of the at least one session key; and storing the new receipt in the storage unit.

According to another aspect of the present invention, there is provided a non-transitory, computer-readable medium storing encrypted computer-readable instructions that, when decrypted and executed by a control unit of a secure element cause the control unit of the secure element to: initiating a secure channel; generating at least one shared secret by executing an elliptic curve key agreement based on the static key pair; generating at least one session key for secure messaging over the secure channel based on the at least one shared secret and shared information, wherein the shared information includes the receipt; determining a new receipt based on one of the at least one session key; and storing the new receipt in the storage unit.

The receipt may be a data structure, e.g., a sequence of bytes having a predetermined length and a value that is determined during the previous elliptic curve key agreement. In other words, the receipt has been determined during a previous mutual authentication.

The secure element, the terminal, the method and/or the related non-transitory, computer-readable medium are configured to perform mutual authentication that is offline-scriptable and is protected from a replay mechanism.

The secure element, the terminal, the method and/or the non-transitory, computer-readable medium may include one or more of the following features:

The static key pair may be a cryptographic key pair including a public part and a private part. In the following, the public part of the cryptographic key pair may be also referred to as public key and the private part accordingly as private key.

The external entity may be also referred to as remote entity or off-card entity (OCE). The external entity may be split into a remote entity that precomputes data and a local agent (e.g. an application on a terminal device or on a connected device) that forwards data to the secure element. The external entity may precompute the commands or receive precomputed commands from another entity.

The secure channel may be a SCP11c secure channel, preferably as specified in Global Platform Secure Channel Protocol '11'—Amendment F. The control unit may be configured to generate the at least one session key, preferably at least four session keys, based on a MUTUAL AUTHENTICATE command, preferably one of the session keys is used to calculate a receipt.

The at least one shared secret may include a first shared secret calculated from one ephemeral OCE key, i.e., an ephemeral key of the external entity, and the static key pair of the secure element (Shses). The at least one shared secret may include a second shared secret calculated from a static key of the OCE key and the static key pair of the secure element (Shsss). The first shared secret Shses and the second shared secret Shsss may be combined, in particular concatenated, into one shared secret (ShS) which may be input into a key derivation function to generate the at least one session key, preferably at least four session keys. The key derivation function may be specified as ANSI X9.63 Key Derivation function (SHA-256).

The shared secret ShS generated by the elliptic curve key agreement algorithm may be used as an input to a key derivation or key generation process. A key for calculating a receipt and/or the session keys, which may include the receipt key, may be derived from the shared secret as defined in the standard BSI TR-03111, Version 2.0, for the "X9.63 Key Derivation Function". This key derivation includes additional information, the shared information, or also named as "SharedInfo", of the key derivation algorithm. The shared information may include a key usage qualifier, e.g., as specified in tag '95' of a MUTUAL AUTHENTICATE command. The shared information may include a key type, e.g., as specified in tag '80' of a MUTUAL AUTHENTICATE command. The shared information may include a key length, e.g., as specified in tag '81' of a MUTUAL AUTHENTICATE command.

The at least one session key may include a receipt key, by which the new receipt can be determined or calculated. The at least one session key may include a Secure Channel C-MAC session key (S-MAC). The at least one session key may include a Secure Channel R-MAC session key (S-RMAC). The at least one session key may include a Secure Channel session key for command and response encryption (S-ENC). The at least one session key may include an optional Session Data Encryption Key (S-DEK). Session keys are generated to ensure that a different set of keys is used for each secure channel session.

The receipt may be generated using the derived receipt key and input data for the MUTUAL AUTHENTICATE command using CMAC function algorithm as specified in the norm NIST SP 800-3B. The control unit may be configure to provide the receipt for sending it back to the network entity as a response of the MUTUAL AUTHENTICATE command. The network entity may use the receipt to verify the correctness of the calculation of the session keys.

The control unit may be further configured to receive a MUTUAL AUTHENTICATE command in which an option to include an identifier of the external entity and an identifier of the secure element in the shared information is enabled. The control unit may be configured to generate the at least one session key based on the MUTUAL AUTHENTICATE command.

The MUTUAL AUTHENTICATE command may be specified in GlobalPlatform Technology Secure Channel Protocol '11' Card Specification v2.3—Amendment F (short: GP CS Amd F) and may include identifiers and parameters related to the secure channel, also known as SCP identifier and SCP parameters, respectively. For instance, the SCP11c variant may be activated in the MUTUAL AUTHENTICATE command by setting bit 1 and bit 2 of the SCP identifiers as specified in byte 1 of tag '90' as per GP CS Amd F v1.4 Table 7-15 in combination with GP CS Amd F v1.4 Table 7-2. The option to include an identifier of the external entity and an identifier of the secure element in generating the at least four session keys may be enabled by setting the bit 3 of the SCP parameters as specified in byte 2 of tag '90' of the MUTUAL AUTHENTICATE command according to GP CS Amd F v1.4 Table 7-2. The identifier of the external entity may include a Host ID, preferably the length and value of the Host ID. The Host ID may be specified in tag '84' of the MUTUAL AUTHENTICATE command.

The identifier of the secure element may be provided by a subject identifier of a certificate of the secure element, the certificate containing a public key of the static key pair used during the elliptic curve key agreement. The control unit may be further configured to update the subject identifier based on the receipt. The control unit may be configured to subsequently update a signature of the certificate.

The certificate may be specified as the CERT.SD.ECKA according to the GP CS Amd F. The subject identifier may be specified in tag '5F20' from the CERT.SD.ECKA certificate. The subject identifier may represent a common identifier for a group of cards sharing the same CERT.SD.ECKA, also referred to as a card group ID.

This aspect of the present disclosure has the advantage that the chaining of the receipt into a subsequent key derivation may be implemented essentially within the presently valid GP CS Amd F.

The control unit may be further configured to sign the certificate using a private key of a controlling authority, preferably an intermediate controlling authority, for providing certificates for the external entity.

In order to add the receipt in the subject identifier field of CERT.SD.ECKA certificate, a SK.CA-KLOC.ECDSA key, preferably a SK.KA-KLOC.ECDSA key, may be stored in the storage unit of the secure element such that the SK.CA-KLOC.ECDSA key, preferably the SK.KA-KLOC.ECDSA key, may be used to sign the updated certificate CERT.SD.ECKA.

This approach reuses most of the current version of GP CS Amd F specification, the commands and tags are not modified in any manner. Using the key of the intermediate controlling authority KA-KLOC may reduce potential security concerns related with configuring the SK.CA-KLOC.ECDSA as part of the configuration of the secure element, more precisely a security domain of the secure element.

The control unit may be further configured to receive a MUTUAL AUTHENTICATE command in which an option to include the receipt in the shared information is enabled. The control unit may be further configured to store the new receipt in a non-volatile memory of the storage unit.

The option to include the receipt in the shared information may be a new option within the SCP parameters as per GP CS Amd F. The option may be enabled by setting an additional flag under tag '90' of the input data to the MUTUAL AUTHENTICATE command, preferably by setting bit 4 in byte 2 of GP CS Amd F v1.4 Table 7-2 or a bit in a new byte 3.

The shared information may include the receipt, preferably a length and a value of the receipt. Thus, the calculated receipt may be directly fed into the next MUTUAL AUTHENTICATE command as input data. In other words, this approach proposes the addition of a new option in the SCP identifiers and parameters to explicitly include the usage of the previous calculated receipt during the key derivation process.

On reception of the MUTUAL AUTHENTICATE command with this option enabled, the session key generation process is done in the same manner as defined in GP CS Amd F, but the receipt will be used and concatenated for SCP11c variant in SharedInfo during the key derivation process of the session keys, in particular as length and value of the previously calculated receipt.

The control unit may be configured to store the calculated receipt permanently, e.g. in non-volatile memory of the storage unit, to enable its usage in the next, subsequent authentication process if the option to include the receipt in the shared information is enabled.

Despite requiring a modification of the specification of SCP identifiers and parameters as per GP CS Amd F, the approach according to this aspect of the disclosure is the preferred approach since it does not introduce any new security concerns while preventing the replay mechanism of the SCP11 variant. Moreover, the identifier of the external entity and the identifier of the secure element do not need to be included in the shared information according to this aspect of the disclosure.

The storage unit may further store a first receipt to be used as the receipt for a first mutual authentication of the secure element with the external entity of a communication network. The first receipt may be an initial receipt that may be used for the very first authentication performed by the secure element. The first receipt may include a predetermined value. The first receipt may include a random value. The first receipt may be configured during the production stage of the secure element.

The control unit may be further configured to receive a receipt request from the external entity. The control unit may be further configured to provide the external entity with the receipt to be used for a current mutual authentication of the secure element with the external entity. The control unit may be further configured to provide the external entity with the receipt stored in the storage unit. While the off-card entity can calculate the receipt on its own, the new command to retrieve the stored receipt might be useful to allow the off-card entity to retrieve the last stored receipt in case it is necessary.

The control unit may be further configured to receive a MUTUAL AUTHENTICATE command in which an option to include an identifier of the external entity, an identifier of the secure element and the receipt in the shared information is enabled. The control unit may be configured to generate the at least one session key, preferably at least four session keys, based on the MUTUAL AUTHENTICATE command. The new receipt may be stored in a non-volatile memory of the storage unit.

The option may be enabled by setting byte 2 bit 3 under tag '90' of the MUTUAL AUTHENTICATE command, as per GP CS Amd F v1.4 Table 7-15.

The option according to this aspect of the disclosure may be a variant of the new option for the SCP parameters introduced according to the previous aspect of the disclosure. Instead of having a new option parameter to use the receipt in the key derivation process, the approach according to this aspect of the disclosure redefines the option accessible under byte 2 bit 3 of the SCP parameters as per GP CS Amd F v1.4 Table 7-2 to include the receipt in the key derivation. The shared information may include the identifier of the external entity, the identifier of the secure element, and the receipt according to this aspect of the disclosure.

The control unit may be configured to provide a flag to the external entity indicating completion of mutual authentication and/or a successful storage of the new receipt. This flag may indicate the end of the mutual authentication and therefore may indicate that the new receipt has been stored.

However, in case the security domain and/or the control unit of the secure element do not have any indication that an offline script including the mutual authentication has reached its end, the new receipt may be stored just after it is calculated. This approach ensures that the same offline script cannot be sent more than one time, no matter the situation. However, in case of interruptions before the script is completed, storing the receipt directly after its generation will prevent re-execution of the same offline script. Therefore, the offline script may remain incomplete. Furthermore, when considering a large fleet of connected devices, the same offline script may be successfully executed in the secure elements of a part of the connected devices and (permanently) interrupted in the secure elements of another part of the connected devices, thereby creating inconsistent situations. The offline script may be a static command script.

The control unit may be configured to generate the at least one session key and to determine the new receipt within an atomic transaction. The control unit may be further configured to store the new receipt upon receiving a COMMIT TRANSACTION during execution of the atomic transaction.

The atomic transaction may be triggered by the PERFORM TRANSACTION OPERATION command as defined in GP CS Amd F as the point to store the receipt. The PERFORM TRANSACTION OPERATION command may be used to generate and to manage the creation of new card contents within an atomic transaction that can be useful to prevent incomplete setup of card contents in case of interruption(s).

According to a preferred embodiment, usage of the receipt during key derivation process may be performed if the appropriate option is enabled in an input data to the MUTUAL AUTHENTICATION command but the calculated receipt stored in the storage unit may only be updated in case of the respective offline script execution is under a transaction, using the PERFORM TRANSACTION OPERATION command, wherein the calculated receipt may be stored only when COMMIT TRANSACTION is received. In that manner it is ensured that at least the relevant part of the offline script can be executed at least once.

The term "secure element" is synonymous with the term "UICC", "eUICC", "iUICC", "Subscriber Identity Module", "Smart Card", "iUICC", "Integrated eUICC", "Integrated Secure Element", "embedded Secure Element", "Secure Element", "SIM", "eSIM" or "iSIM". Secure elements also include USIM, TSIM, ISIM, CSIM or R-UIM.

A secure element, abbreviated SE, in the sense of the invention is an electronic module reduced in size and resource scope, which may have a control unit (microcontroller) and at least one interface (data interface) for communication with instances located outside the secure element, such as terminal devices, servers, etc. This communication preferably takes place via a connection protocol, in the case of a secure element, in particular a protocol in accordance with the ETSI TS 102 221 or ISO-7816 standard.

The secure element can also be an integral part of a larger integrated circuit, such as a modem or application processor. Such SEs are referred to as "integrated UICC," "integrated TRE," "integrated eUICC," or "integrated SE." Such SEs are permanently integrated into an SoC as an integrated processor block and can be connected via an in-chip bus. The SE has, for example, an internal or external secure non-volatile memory area in which the identity data is securely placed to prevent tampering and/or misuse attempts during identification and/or authentication to the network.

In one embodiment, the secure element can be operable by means of a terminal device, whereby the SE in this embodiment is self-sufficient except for supply signals such as supply voltage, clock, reset, etc. Then the secure element may have an interface (data interface, communication interface) for communication with the terminal device, into which the secure element may be inserted ready for operation. This communication preferably takes place via a connection protocol, in particular a protocol in accordance with the ETSI TS 102 221 or ISO-7816 standard.

Provided is further a terminal device that is adapted to communicate securely over a mobile communication network. The terminal device comprises a secure element as described above, and a communication interface which is adapted to communicate via the communication network.

The terminal device may be adapted to forward data packages between the secure element and the network entity.

Provided is also a system for securely communicating over a communication network. The system comprises a terminal device and an off-card entity.

The terminal device comprises a secure element as described above and a communication interface. The terminal device is configured to receive an authentication request from the external entity or transmit an authentication request of the secure element to the external entity to initiate a mutual authentication process with the external entity.

The external entity is configured to transmit an authentication request to the terminal device or receive a proactive authentication request of the secure element from the terminal device, participate in executing the mutual authentication process; and establish the secure communication channel to the communication interface of the terminal device.

Provided is also a corresponding method.

The method may further comprise receiving a MUTUAL AUTHENTICATE command in which an option to include an identifier of the external entity and an identifier of the secure element in the shared information is enabled, wherein the generating the at least one session key, preferably at least four session keys, is based on the MUTUAL AUTHENTICATE command. In one preferred embodiment, the method may further include receiving a PERFORM SECURITY OPERATION command preceding the MUTUAL AUTHENTICATION command to prepare for the key derivation performed under the MUTUAL AUTHENTICATION command. The identifier of the secure element may be provided by a subject identifier of a certificate of the secure element, the certificate containing a public key of the static key pair using during the elliptic curve key agreement. The method may further comprise updating the subject identifier based on the receipt.

The method may further comprise receiving a MUTUAL AUTHENTICATE command in which an option to include the receipt in the shared information is enabled. The new receipt may be stored permanently in a non-volatile memory of the storage unit.

The method may further comprise receiving a MUTUAL AUTHENTICATE command in which an option to include an identifier of the external entity, an identifier of the secure element and the receipt in the shared information is enabled, wherein the generating the at least one session key is based on the MUTUAL AUTHENTICATE command. The new receipt may be stored permanently in a non-volatile memory of the storage unit.

Generating the at least one session key, preferably at least four session keys, and determining the new receipt may be executed within an atomic transaction. The method may further comprise storing the new receipt upon receiving a COMMIT TRANSACTION during execution of the atomic transaction.

In the following, the invention or further embodiments and advantages of the invention are explained in more detail based on drawings, wherein the drawings describe only embodiments of the invention. Identical components in the drawings are given the same reference signs. Elements drawn with dashed lines are considered as optional elements.

BRIEF DESCRIPTION OF THE DRAWINGS

The drawings are not to be regarded as true to scale, and individual elements of the drawings may be shown in exaggeratedly large or exaggeratedly simplified form.

DETAILED DESCRIPTION OF THE INVENTION

Figure 1:
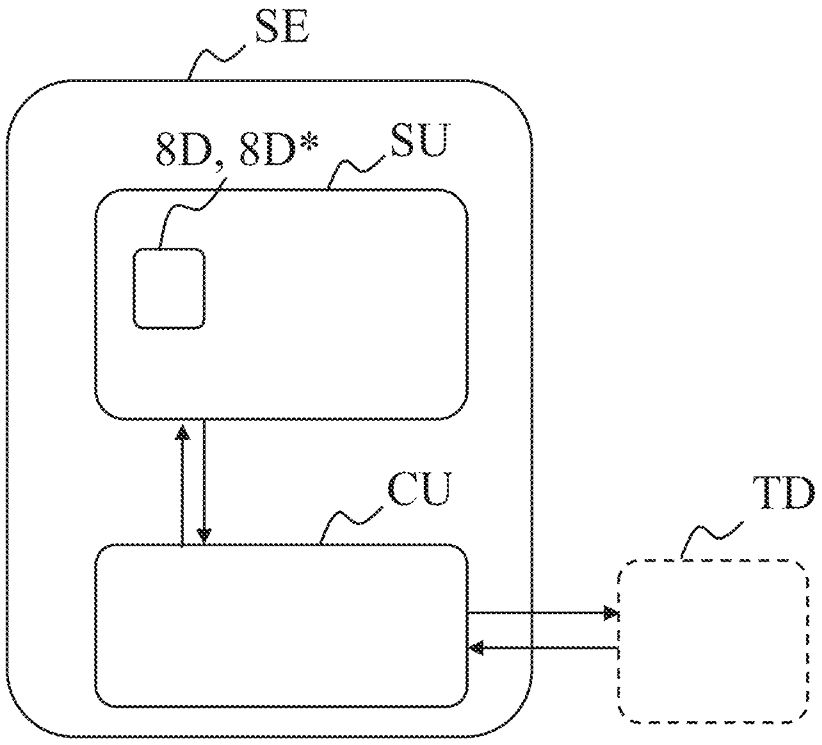
FIG. 1 shows an exemplary embodiment of a secure element according to an aspect of the disclosure.

The secure element SE according to FIG. 1 may comprise a storage unit SU and a control unit CU. The secure element SE may comprise a security domain (not shown). In the storage unit SU, a static key pair (not shown) may be stored. The static key pair may comprise a private key SK.SD.ECKA (see FIG. 4). In the storage unit SU, a receipt 8D may be stored. The static key pair and the receipt 8D may be accessible by the security domain. The static key pair may be used during an elliptic curve key agreement. The receipt 8D may be a byte string representing the receipt of a previous successfully completed authentication procedure. The receipt 8D may be stored directly in the storage unit. The receipt 8D may be stored within the subject identifier of the certificate CERT.SD.ECKA containing a public key of the static key pair used during the elliptic curve key agreement.

Moreover, in the storage unit SU, a set of computer-readable instructions for mutual authentication of the secure element with an external entity of a communication network may be stored.

The control unit CU of the secure element SE may be configured to initiate a secure channel. The control unit CU of the secure element SE may be configured to initiate a secure channel session. Initiating a secure channel may refer to receive a PERFORM SECURITY OPERATION request of the external entity OCE. Initiating a secure channel may comprise receiving a certificate CERT.OCE.ECKA of the external entity OCE, verifying the certificate CERT.OCE.ECKA, and—if successfully verified—extracting the public key PK.OCE.ECKA of the external entity OCE from the certificate CERT.OCE.ECKA. Initiating the secure channel may further include providing a PERFORM SECURITY OPERATION response to the external entity OCE.

After execution of the PERFORM SECURITY OPERATION and prior to executing an elliptic curve key agreement ECKA, the control unit CU of the secure element may be configured to receive the ephemeral key from the external entity OCE via MUTUAL AUTHENTICATE command.

The control unit CU of the secure element SE may be configured to generate at least one shared secret ShSes, ShSss, ShS by executing an elliptic curve key agreement ECKA based on the static key pair. elliptic curve key agreement ECKA may additionally be based on the public key PK.OCE.ECKA of the external entity OCE and the received ephemeral key of the external entity OCE.

The control unit CU of the secure element SE may be configured to generate at least four session keys for secure messaging over the secure channel based on the at least two shared secrets and shared information, wherein the shared information includes the receipt 8D. The at least one session key may also include a receipt key (not shown), based on which the external entity OCE may verify the correctness of the receipt and thus verify the key derivation performed by the secure element SE.

The control unit CU of the secure element SE may be configured to determine a new receipt 8D* based on one of the at least one session key. The control unit CU of the secure element SE may be preferably configured to determine a new receipt 8D based on the receipt key.

The control unit CU of the secure element SE may be configured to store the new receipt 8D* in the storage unit. The control unit CU of the secure element SE may be configured to update the receipt 8D in the storage unit based on the newly determined receipt 8D*. Preferably, at every instance, only one receipt 8D, 8D* is stored in the storage unit SD.

Figure 2:
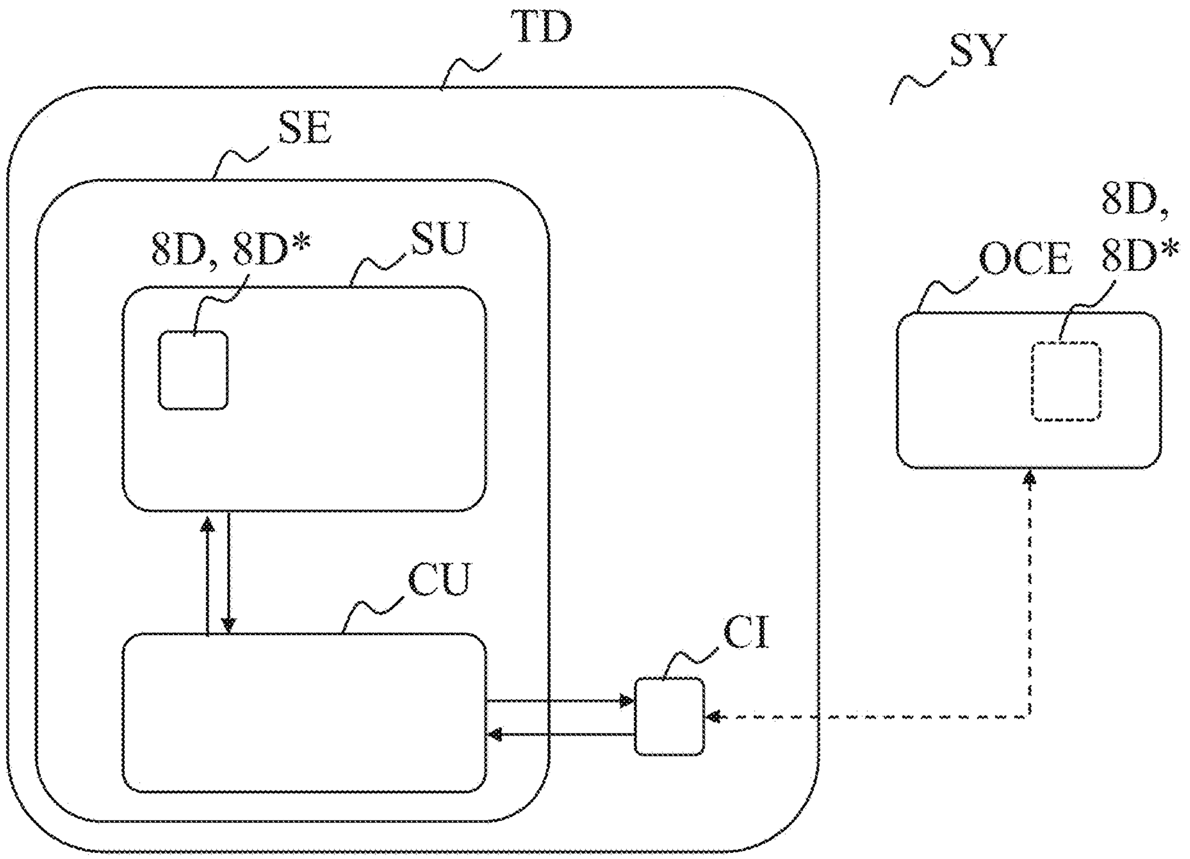
FIG. 2 shows an exemplary embodiment of a system according to an aspect of the disclosure.

The control unit CU of the secure element SE may communicate via a terminal device TD, as also shown in FIG. 2.

FIG. 2 shows an exemplary embodiment of a system SY according to an aspect of the disclosure.

The system SY may include the secure element SE, e.g., as described with respect to FIG. 1. The secure element SE may be hosted in a terminal device TD. The system SY may further include the external entity OCE. The external entity OCE may communicate with the terminal device TD via a communication interface CI of the terminal device. The secure element SE may secure the communication channel between the terminal device TD and the external entity OCE.

The external entity OCE may perform a key derivation corresponding to the one performed by the control unit CU of the secure element SE. The external entity OCE may determine a new receipt 8D* on its own and/or receive the new receipt 8D* from the secure element SE, in particular via the communication interface CI of the terminal device TD.

Figure 3:
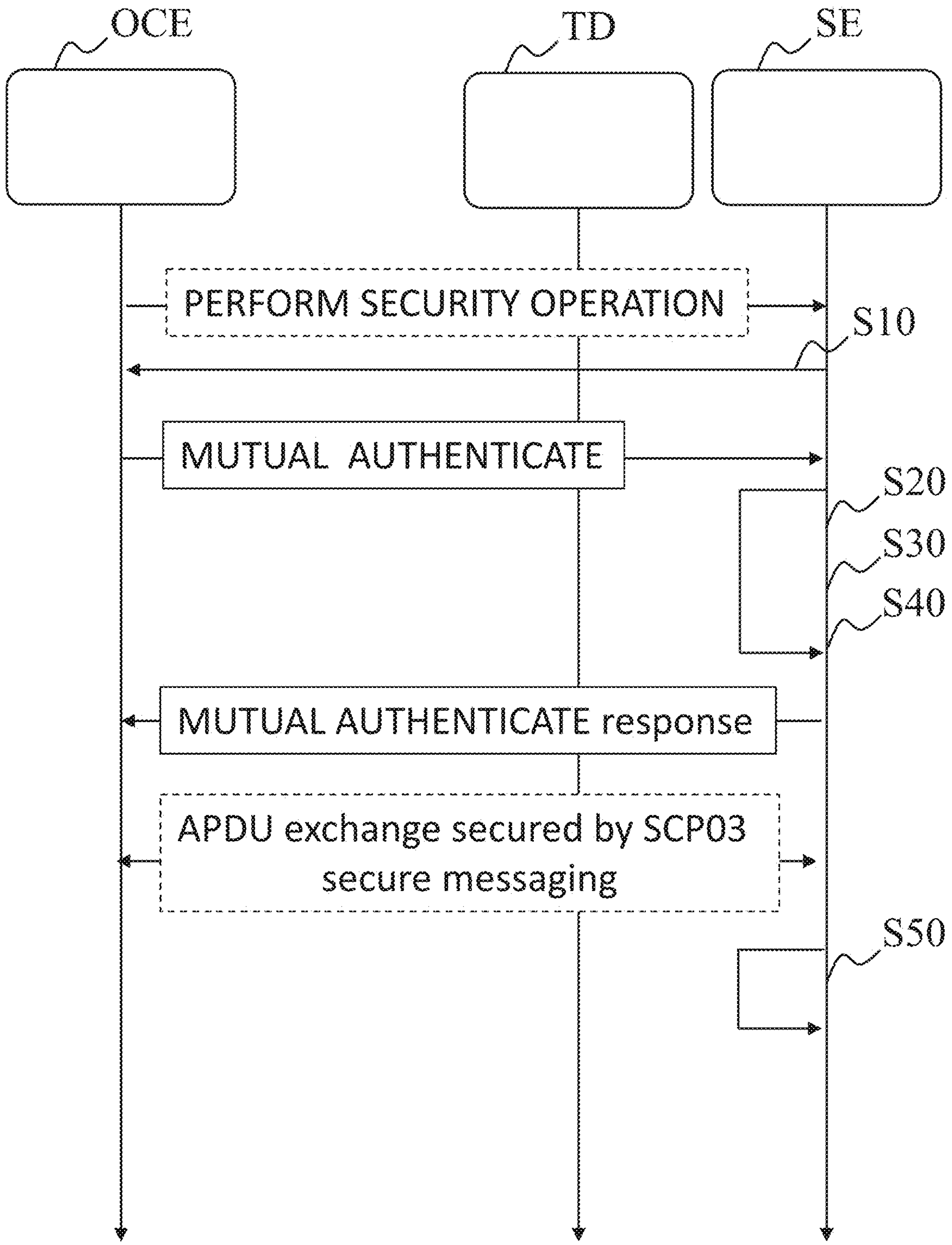
FIG. 3 shows a sequence diagram of a method of mutually authenticating a secure element with an external entity of a communication network according to an aspect of the disclosure.

FIG. 3 shows a sequence diagram of a method of mutually authenticating a secure element SE with an external entity OCE according to an aspect of the disclosure.

The method may involve the secure element SE, a terminal device TD hosting the secure element SE and the external entity OCE. In the following, the method is described as viewed from the secure element SE.

The method may include receiving a PERFORM SECURITY OPERATION from the external entity OCE. This command may notify the secure element SE to initialize a secure channel or a secure channel session in a first step S10.

In response to the first step, the secure element SE may receive a MUTUAL AUTHENTICATE request or command. The input to the MUTUAL AUTHENTICATE command may include SCP identifiers and parameters which may be specified based on GP CS Amd F v1.4, Table 7-2. The SCP identifiers and parameters may be accessed by tag '90' of the control reference template for ECKA (tag 'A6'). An example configuration of the SCP identifiers and parameters according to an aspect of the disclosure is summarized below as Table 1.

AUTHENTICATE command as a SharedInfo: Key Usage Qualifier (Tag '95'); Key Type (Tag '80'); Key Length (Tag '81').

Additionally, when "Include Host and Card ID in key derivation process" option is enabled in SCP parameters of the MUTUAL AUTHENTICATE command, the following data shall be concatenated for SCP11c variant in SharedInfo during the key derivation process of the session keys: Length and value of the Host ID from MUTUAL AUTHENTICATE command (Tag '84'); Length and value of the Card Group ID (Subject Identifier-Tag '5F20', in CERT.SD.ECKA, as defined in GP CS Amd A Table 3-6).

According to GP CS Amd F, card group ID is 'a common identifier for a group of cards sharing the same CERT.SD.ECKA'. It is intended to identify a group of cards sharing the same credentials. Therefore, using the Host and card Group ID option, session keys may be calculated only for the specified card group ID.

The card group ID is defined as the subject identifier (Tag '5F20') value from the certificate CERT.SD.ECKA. This certificate contains the public key of the static key pair stored in the storage unit SU of the secure element SE and used during the key agreement ECKA. The certificate CERT.SD.ECKA may be signed by SK.CA-KLCC.ECDSA key (or SK.KA-KLCC.ECDSA).

According to a first aspect of the disclosure, the configuration of the SCP identifiers and parameters for the MUTUAL AUTHENTICATE command may be specified as in Table 1. When 'Include Host and Card Group ID in key derivation process' option (Byte 2 Bit 3 of SCP identifiers and parameters provided in MUTUAL AUTHENTICATE command as per Table 1), the HostID-LV (length-value pair) and Card Group ID-LV are included as input for the derivation of the session keys. HostID is provided as part of the data in the MUTUAL AUTHENTICATE command. Card Group ID is the value of Subject Identifier (Tag 5F20) in the certificate CERT.SD.ECKA. The subject identifier of the certificate CERT.SD.ECKA may be updated with the receipt 8D* once it is calculated. Accordingly, the signature of the certificate may be recalculated. Thus, the new receipt 8D* may be used in the subsequent authentication process.

In order to add the new receipt 8D* in the subject identifier field of the certificate CERT.SD.ECKA, the secure element SE, in particular its security domain, should be configured with the private key of the controlling authority for OCE certificates SK.CA-KLOC.ECDSA, or preferably private key of an intermediate controlling authority SK.KA-KLOC.ECDSA to sign the updated certificate CERT.SD.ECKA.

The method further includes a second step S20, preferably executed in response to the MUTUAL AUTHENTICATE command, according to which at least one shared key by executing an elliptic curve key agreement based on the static key pair is generated.

TABLE 1

| b8 | b7 | b6 | b5 | b4 | b3 | b2 | b1 | description |
|---|---|---|---|---|---|---|---|---|
| — | — | — | — | — | — | 1 | 1 | 11: indicates SCP11c |
| — | — | — | — | — | 1 | — | — | 1: include host and card ID/card group ID in key derivation process |
| x | x | x | x | x | — | — | — | RFU (value 0) |

If b3 of Byte 2 (second row in Table 1) is set, the host ID may be provided under tag '84' in the data field for the MUTUAL AUTHENTICATE command.

As per GP CS Amd F, the key session derivation process shall include at least the following data from MUTUAL The method further includes a third step S30, which is based on the second step S20, and involves generating at least one session key for secure messaging over the secure channel based on the at least one shared secret and shared information. The shared information includes the receipt 8D. By chaining the previously calculated receipt 8D into the input to the third step S30, distinct session keys may be generated during each authentication, even within the SCP11c variant.

Figure 4:
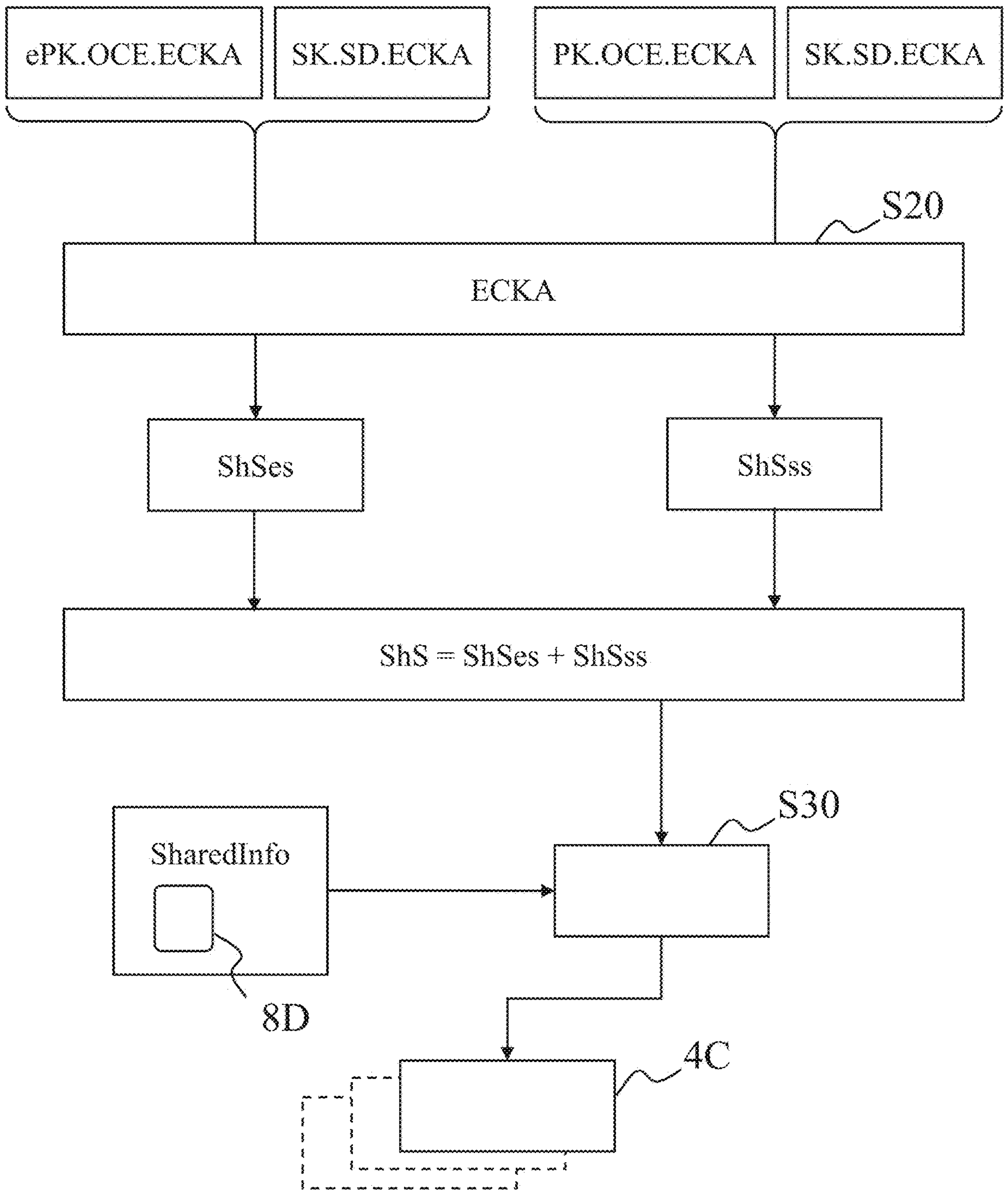
FIG. 4 shows a high-level flow diagram for generating at least four session keys according to an aspect of the disclosure.

The third step S30 for generating the at least one session key according to an aspect of the disclosure of the method according to FIG. 3 is also shown as a high-level flow diagram in FIG. 4.

According to a second aspect and a third aspect, the receipt 8D may be directly input as additional parameter of the shared information. To achieve this input, modifications of the above Table 1 are proposed.

According to the second aspect of the present disclosure, the SCP identifiers and parameters may be enriched by setting bit 4 of byte 2 to indicate inclusion of the stored receipt 8D, as shown in Table 2 below.

be used in the subsequent calculations. As it is not possible to know the end of an offline script (the secure element SE does not have any indication that the script issued by the external entity OCE has reach the end), storing the new receipt 8D* just after it is calculated may ensure that the script cannot be sent more than one time, no matter the situation. However, in case of interruptions or if the script is not completed, storing the new receipt 8D* directly after its generation will prevent any re-execution of the script.

Preferably, the PERFORM TRANSACTION OPERATION command as defined in GP CS Amd F may be used as the point to store the new receipt 8D*. The PERFORM TRANSACTION OPERATION command, is used to generate and to manage the creation of new card contents within an atomic transaction that can be useful to prevent incomplete setup of card contents in case of interruption(s). In case of an interruption, a roll back of the script may be performed such that a new attempt to run the same script may be available.

TABLE 2

| b8 | b7 | b6 | b5 | b4 | b3 | b2 | b1 | description |
|---|---|---|---|---|---|---|---|---|
| — | — | — | — | — | — | 1 | 1 | 11: indicates SCP11c |
| — | — | — | — | — | 1 | — | — | 1: include host and card ID/card group ID in key derivation process |
| — | — | — | — | 1 | — | — | — | 0: do not include receipt in key derivation process<br>1: include receipt in key derivation process |
| x | x | x | x | — | — | — | — | RFU (value 0) |

On reception of the MUTUAL AUTHENTICATE command with this option enabled, the session calculation process may be done in the same manner as defined in GP CS Amd F, but the receipt will be used and concatenated for SCP11c variant in SharedInfo during the key derivation process of the session keys: Length and value of the previous calculated receipt 8D.

The newly calculated receipt 8D* shall be stored permanently to be utilized in the next authentication process if include receipt in key derivation process option is selected.

According to the third aspect of the present disclosure, the SCP identifiers and parameters, in particular the 'Include Host and Card Group ID in key derivation process' option, may be adapted to include the receipt. This approach is a variant of the approach according to the second aspect ('Include receipt in key derivation process'). Instead of having a new option parameter to use the receipt 8D in the key derivation process, the 'Include Host and Card Group ID in key derivation process' may be redefined to include the receipt 8D in the key derivation process. The meaning or definition of Bit 3 of Byte 2 in Table 1 may be redefined to "Include Host, Card Group ID and receipt in key derivation process". During the key derivation process, the length and value of the previous calculated receipt may be additionally concatenated to the SharedInfo of the SCP11c variant.

During the authentication process, the new receipt 8D* is generated in a fourth step S40 using the derived receipt key, the shared information as input data, preferably with CMAC function algorithm (NIST SP 800-3B). The new receipt8D* may be sent back as a response of the MUTUAL AUTHENTICATE command, so it can be used by the external entity OCE to verify the correctness of the calculation of the session keys.

In a fifth step S50, the generated receipt 8D* is stored. it is very important to determine when the new receipt 8D* shall be stored in NVM memory by the control unit CU to Preferably, only upon receiving the PERFORM TRANSACTION OPERATION with P2=COMMIT TRANSACTION, the new receipt 8D* may be stored. In that manner it is ensured that at least the relevant part of the script can be executed at least once. When the receipt is stored using the PERFORM TRANSACTION OPERATION command, if this command is not present in the script the calculated receipt 8D* may not be stored such that the antireplay mechanism will have no effect for that script.

In summary, the present disclosure provides solutions for chaining the session keys derived by the secure element. This chaining can be implemented into a secure element by using the previous receipt calculated at the end of the key derivation process as input to derive the new session keys. In this manner, the session keys will be valid only one time and the generated script with these session keys can only be executed once.

The invention claimed is:

1. A secure element, comprising:

a storage unit, in which a set of computer-readable instructions for mutual authentication of the secure element with an external entity, a static key pair, and a receipt are stored; and a control unit which is configured to execute the set of computer-readable instructions which configure the control unit to:

initiate a secure channel;

generate at least one shared secret by executing an elliptic curve key agreement based on the static key pair;

generate, within an atomic transaction, at least one session key for secure messaging over the secure channel based on shared information and the at least one shared secret, wherein the shared information includes the receipt;

determine, within the atomic transaction, a new receipt based on one of the at least one session key; and store the new receipt in the storage unit upon receiving a COMMIT TRANSACTION during execution of the atomic transaction.

2. The secure element according to claim 1, wherein the control unit is further configured to receive a MUTUAL AUTHENTICATE command in which an option to include an identifier of the external entity and an identifier of the secure element in the shared information is enabled, wherein the control unit is configured to generate the at least one session key based on the MUTUAL AUTHENTICATE command.

3. The secure element according to claim 2, wherein the identifier of the secure element is provided by a subject identifier of a certificate of the secure element, the certificate containing a public key of the static key pair used during the elliptic curve key agreement, and wherein the control unit is further configured to update the subject identifier based on the receipt.

4. The secure element according to claim 3, wherein the control unit is further configured to sign the certificate using a private key of a controlling authority, preferably an intermediate controlling authority, for providing certificates for the external entity.

5. The secure element according to claim 1, wherein the control unit is further configured to receive a MUTUAL AUTHENTICATE command in which an option to include the receipt in the shared information is enabled; and wherein the new receipt is stored in a non-volatile memory of the storage unit.

6. The secure element according to claim 5, wherein the option is enabled by setting an additional flag under tag '90' of the MUTUAL AUTHENTICATE command.

7. The secure element according to claim 5, wherein the shared information includes the receipt, preferably a length and a value of the receipt.

8. The secure element according to claim 1, wherein the secure channel is a SCP11c secure channel, preferably as specified in Global Platform Secure Channel Protocol '11'—Amendment F, and wherein the control unit is configured to generate the at least one session key, preferably at least four session keys, based on a MUTUAL AUTHENTICATE command.

9. The secure element according to claim 1, wherein the storage unit further stores a first receipt to be used as the receipt for a first mutual authentication of the secure element with the external entity, wherein the first receipt includes a predetermined value.

10. The secure element according to claim 1, wherein the control unit is further configured to receive a receipt request from the external entity and to provide the external entity with the receipt to be used for a current mutual authentication of the secure element with the external entity.

11. The secure element according to claim 1, wherein the control unit is further configured to receive a MUTUAL AUTHENTICATE command in which an option to include an identifier of the external entity, an identifier of the secure element and the receipt in the shared information is enabled, wherein the control unit is configured to generate the at least one session key based on the MUTUAL AUTHENTICATE command; and wherein the new receipt is stored in a non-volatile memory of the storage unit.

12. The secure element according to claim 11, wherein the option is enabled by setting bit 3 under tag '90' of the MUTUAL AUTHENTICATE command.

13. The secure element according to claim 1, wherein the control unit is configured to provide a flag to the external entity indicating a completion of mutual authentication and/or a successful storage of the new receipt.

14. A method of mutually authenticating a secure element with an external entity, the method comprising:

initiating a secure channel;

generating at least one shared secret by executing an elliptic curve key agreement based on a static key pair stored in the secure element;

generating, within an atomic transaction, at least one session key for secure messaging over the secure channel based on shared information and the at least one shared secret, wherein the shared information includes a receipt stored in the secure element;

determining, within the atomic transaction, a new receipt based on one of the at least one session key; and storing the new receipt in a storage unit of the secure element upon receiving a COMMIT TRANSACTION during execution of the atomic transaction.

15. The method of claim 14, further comprising receiving a MUTUAL AUTHENTICATE command in which an option to include an identifier of the external entity and an identifier of the secure element in the shared information is enabled, wherein the generating the at least one session key is based on the MUTUAL AUTHENTICATE command; and wherein, preferably, the identifier of the secure element is provided by a subject identifier of a certificate of the secure element, the certificate containing a public key of the static key pair using during the elliptic curve key agreement and wherein the method further comprises updating the subject identifier based on the receipt.

16. The method of claim 14, further comprising receiving a MUTUAL AUTHENTICATE command in which an option to include the receipt in the shared information is enabled, wherein storing the new receipt includes storing the new receipt in a non-volatile memory.

17. The method of claim 14, further comprising receiving a MUTUAL AUTHENTICATE command in which an option to include an identifier of the external entity, an identifier of the secure element and the receipt in the shared information is enabled, wherein the generating the at least one session key is based on the MUTUAL AUTHENTICATE command, wherein storing the new receipt includes storing the new receipt in a non-volatile memory.

18. The method of claim 14, wherein the generating at least one session key and the determining the new receipt are executed within an atomic transaction, and wherein the method further comprises:

storing the new receipt upon receiving a COMMIT TRANSACTION during execution of the atomic transaction.

19. A non-transitory, computer-readable medium storing encrypted computer-readable instructions that, when decrypted and executed by a control unit of a secure element cause the control unit of the secure element to:

initiate a secure channel;

generate at least one shared secret by executing an elliptic curve key agreement based on a static key pair stored in the secure element;

generate, within an atomic transaction, at least one session key for secure messaging over the secure channel based on shared information and the at least one shared secret, wherein the shared information includes a receipt stored in the secure element;

determine, within the atomic transaction, a new receipt based on one of the at least one session key; and store the new receipt in a storage unit of the secure element upon receiving a COMMIT TRANSACTION during execution of the atomic transaction.

* * * * *